(12) United States Patent
Kawamoto et al.

(10) Patent No.: US 9,331,494 B2
(45) Date of Patent: May 3, 2016

(54) BATTERY SYSTEM

(71) Applicants: Shinya Kawamoto, Tokyo (JP);
Tamotsu Endo, Tokyo (JP)

(72) Inventors: Shinya Kawamoto, Tokyo (JP);
Tamotsu Endo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 431 days.

(21) Appl. No.: 13/863,950

(22) Filed: Apr. 16, 2013

(65) Prior Publication Data
US 2013/0278065 A1    Oct. 24, 2013

(30) Foreign Application Priority Data

Apr. 23, 2012   (JP) .................................. 2012-097924

(51) Int. Cl.
*H02J 4/00* (2006.01)
*H02J 1/10* (2006.01)
*H02J 7/00* (2006.01)
*H02J 7/34* (2006.01)

(52) U.S. Cl.
CPC . *H02J 4/00* (2013.01); *H02J 1/102* (2013.01); *H02J 7/0021* (2013.01); *H02J 7/34* (2013.01); *Y10T 307/549* (2015.04)

(58) Field of Classification Search
CPC ................ H01J 4/00; H02J 3/32; H02J 4/00; H02J 7/0021; H02J 7/34; H02J 1/102
See application file for complete search history.

(56) References Cited

U.S. PATENT DOCUMENTS

| 5,187,425 | A  | * | 2/1993  | Tanikawa ....................... 320/138 |
| 5,796,580 | A  | * | 8/1998  | Komatsu et al. ......... 361/679.48 |
| 6,510,369 | B1 | * | 1/2003  | Lacy .............................. 700/295 |
| 6,873,322 | B2 | * | 3/2005  | Hartular ........................ 345/212 |
| 8,040,648 | B2 |   | 10/2011 | Baudesson |
| 8,132,409 | B2 | * | 3/2012  | Orosz et al. ................. 60/641.15 |
| 8,138,624 | B2 | * | 3/2012  | Yeh ............................... 307/10.1 |
| 8,836,285 | B2 | * | 9/2014  | Yamada et al. ............... 320/126 |

FOREIGN PATENT DOCUMENTS

| CN | 1531189 A   | 9/2004 |
| CN | 102299533 A | 12/2011 |

* cited by examiner

*Primary Examiner* — Zeev V Kitov
(74) *Attorney, Agent, or Firm* — Baker Botts L.L.P.

(57) ABSTRACT

A battery system includes a battery panel which includes a battery pack including a plurality of secondary battery cells, and a battery management unit to monitor at least one of a voltage, a temperature and a degradation level of the secondary battery cell; and a DC/DC conversion device. The DC/DC conversion device includes an interactive DC/DC converter which converts power discharged from the battery pack into a prescribed voltage to output converted power, and converts power supplied from outside into a prescribed voltage to output converted power; a control unit which controls the interactive DC/DC converter; a communication unit which communicates with the battery management unit and the control unit; a control source unit; and a battery connected to a power supply line of the control source unit through a switch.

9 Claims, 2 Drawing Sheets

BATTERY SYSTEM

CROSS-REFERENCE TO RELATED APPLICATION

This application is based upon and claims the benefit of priority from Japanese Patent Application No. 2012-097924, filed on Apr. 23, 2012, the entire contents of which are incorporated herein by reference.

FIELD

Exemplary embodiments described herein relate to a battery system.

BACKGROUND

Battery systems have been proposed each of which is provided with a battery panel, a DC/DC conversion device, and an AC/DC conversion device, and charges electric power from an electric power system and discharges power to a DC load and an AC load, and is operated in connection with the electric power system. Each of the battery panels of the battery systems like these is provided with a battery pack composed by combining a plurality of secondary battery cells in accordance with battery capacity.

Since a lithium ion secondary battery cell as the secondary battery cell, for example, is at the risk of heat generation and firing due to overcharge and over discharge, in order to protect the secondary battery cell, it is necessary to operate the secondary battery cell under the supervision of a battery management unit (BMU: Battery Management Unit) to monitor voltage and temperature thereof.

In a battery system having a battery pack composed of lithium ion secondary cells, the battery pack can not be charged and discharged in the state in which the battery management unit is not stated up. For the reason, the battery management unit can not be started up under the circumstance in which electric power is not obtained from outside, and thereby the power charged in the battery system could not be supplied to a load sometimes.

DETAILED DESCRIPTION

In general, according to one embodiment, there is provided a battery system including: a battery panel which includes a battery pack including a plurality of secondary battery cells, and a battery management unit to monitor at least one of a voltage, a temperature and a degradation level of the secondary battery cell; and a DC/DC conversion device including: an interactive DC/DC converter which converts power discharged from the battery pack into a prescribed voltage to output converted power, and converts power supplied from outside into a prescribed voltage to output converted power; a control unit which controls the interactive DC/DC converter; a communication unit which communicates with the battery management unit and the control unit; a control source unit which converts the power supplied from the interactive DC/DC converter or from outside into a prescribed voltage to supply converted power to the control unit, the communication unit, and the interactive DC/DC converter; and a battery connected to a power supply line of the control source unit through a switch.

Figure 1:
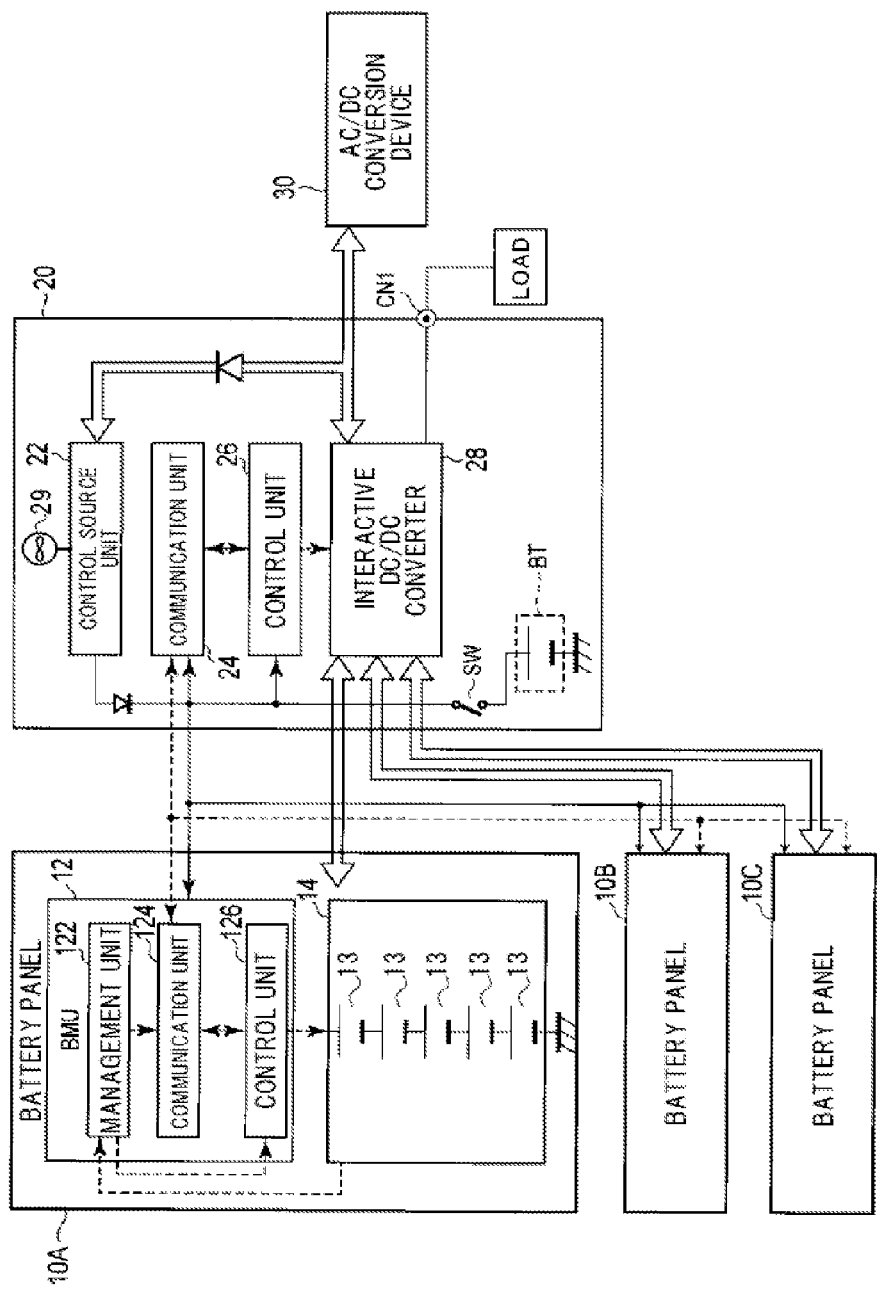
FIG. 1 is a diagram schematically showing a configuration example of a battery system of a first embodiment.

Hereinafter, battery systems of embodiments will be described with reference to the drawings. FIG. 1 is a diagram schematically showing a configuration example of a battery system of a first embodiment.

The battery system of the present embodiment is provided with a plurality of battery panels 10A-10C, a DC/DC conversion device 20, and an AC/DC conversion device 30.

Each of the battery panels 10A-10C is provided with a battery management unit (BMU) 12 and a battery pack 14. The battery management unit 12 is provided with a management unit 122, a communication unit 124, and a control unit 126.

The battery pack 14 is provided with a plurality of secondary battery cells 13 which are connected in series or in parallel. In the present embodiment, the secondary battery cell 13 is a lithium ion secondary battery cell, but may be another secondary battery cell such as a nickel hydrogen battery, a lead battery, a nickel-cadmium battery and the like. The battery pack 14 is a DC power source of 75 V-400 V, for example, and is a power source of 200 V in the present embodiment. The battery pack 14 outputs power of 3-25 kWh, for example. In the present embodiment, the battery pack 14 outputs power of 11 kWh.

The management unit 122 detects voltages and temperatures of the plurality of secondary battery cells 13 composing the battery pack 14. The management unit 122 transmits the detected voltage and temperature values to the communication unit 124 and the control unit 126. In addition, the management unit 122 calculates remaining capacities (SOC: state of charge) and degradation levels (SOH: state of health) and the like using the voltage and temperature values received from the management unit 122, and transmits them to the communication unit 124 and the control unit 126.

The communication unit 124 communicates with the DC/DC conversion unit 20, the management unit 122 and the control unit 126. The communication unit 124 receives the voltage and temperature values 13, the remaining capacities and the degradation levels of the secondary battery cells 13 from the management unit 122, and transmits them to the DC/DC conversion unit 20. In addition, the communication unit 124 receives a control signal from the DC/DC conversion unit 20, and transmits it to the control unit 126.

The control unit 126 charges or discharges the battery pack 14 based on the control signal from the communication unit 124. The control unit 126 receives the remaining capacities and the degradation levels from the management unit 122, and discharges the secondary battery cells 13 with a large remaining capacity to thereby equalize the remaining capacities thereof, and judges overcharge and over discharge of the secondary battery cells 13.

The control unit 126 does not perform discharge and charge of the battery pack 14 when the voltages and temperatures of the secondary battery cells 13 are not detected by the management unit 122. In addition, in case that the secondary battery cells 13 are judged to be in a dangerous situation from the remaining capacities and the degradation levels of the secondary battery cells 13, the control unit 126 stops the charge and discharge of the battery pack 14, and notices that the battery pack 13 is in a abnormal situation to the DC/DC conversion unit 20 through the communication unit 124.

The battery panels 10A-10C may be provided with solar cells as a DC power source. In case that solar cells are provided, the power outputted from the solar cells is charged in the battery pack, or outputted to the DC/DC conversion device 20.

The DC/DC conversion device 20 is provided with a control source unit 22, a communication unit 24, a control unit 26, an interactive DC/DC converter 28, a battery BT, a switch SW, and a connecting portion CN1.

The control source unit 22 is a DC power source of 200 V, for example, and is started up with the power outputted from the interactive DC/DC converter 28 or the power outputted from the AC/DC conversion unit 30 provided outside, and supplies power source to the communication unit 24, the control unit 26, and the battery management units 12 of the battery panels 10A-10C.

The communication unit 24 communicates with the control unit 26 and the communication units 124 of the battery panels 10A-10C. The communication unit 24 receives the voltage and temperature values of the secondary battery cells 13, the remaining capacity and the degradation level of the battery pack 14, and an abnormality of the battery pack 14 from the communication units 124 of the battery panels 10A-10C, and transmits them to the control unit 26. The communication unit 24 transmits a control signal received from an upper level control device (not shown) to the battery panels 10A-10C and the control unit 26.

The control unit 26 controls the interactive DC/DC converter 28 based on the control signal received from the communication unit 24.

The interactive DC/DC converter 28 converts the power supplied from the AC/DC conversion device 30 into a prescribed voltage based on the control signal from the control unit 26 and supplies the converted power as a charging power of the battery pack 14, and converts the power discharged from the battery pack 14 into a prescribed voltage and outputs the converted power to the AC/DC conversion device 30. In addition, the power outputted from the interactive DC/DC converter 28 becomes a power source of the control source unit 22.

A load is connected to the interactive DC/DC converter 28 through the connecting portion (DC load connecting portion) CN1. The interactive DC/DC converter 28 supplies power to the load based on the control signal from the control unit 26.

The battery BT is a lead battery of 12 V, for example, and outputs power of 24 Wh-120 Wh. The battery BT supplies power to at least the communication unit 24, the control unit 26, and the battery management units 12 of the battery panels 10A-10C, when the switch SW is turned on. In addition, the battery BT is charged with the power from the control source unit 22 when the switch SW is turned on.

The switch SW turns off and turns on the power supplying lines between the battery BT and the control source unit 22, the communication unit 24, the control unit 26 and the battery management units 12 of the battery panels 10A-10C. When the control source unit 22 is started up, the switch SW is in the turned on state, and the battery BT is charged with the power outputted from the control source unit 22. When the control source unit 22 is not started up, the switch SW is in the turn off state. The switch SW may be provided outside the DC/DC conversion device 20 and may be manually turned off and turned on by an user when the control source unit 22 is not started up, or may be turned of and turned on in conjunction with the operation of an interface (not shown) such as an operation screen of the DC/DC conversion device 20.

In addition, the DC/DC conversion device 20 may be provided with a cooling unit and an air-conditioning equipment. The cooling unit is a fan 29 and a radiator to cool the interactive DC/DC converter 28. The fan 29 and a pump of the cooling unit are started up with the power from the control source unit 22. The air-conditioning equipment is provided to cool the DC/DC conversion device 20, and is started up with the power from the control source unit 22.

The AC/DC conversion device 30 converts the power supplied from an electric power system into DC power and output it to the DC/DC conversion device 20, and converts the power supplied form the DC/DC conversion device 20 into AC power and outputs it to a load (not shown). In addition, the AC/DC conversion device 30 has communication means to communicate with the communication unit 24 and an upper level control device (not shown), if needed.

Next, an example of the operation of the above-described battery system will be described. In case that power is supplied from the AC/DC conversion device 30, the control source unit 22 of the DC/DC conversion device 20 is started up with the power outputted from the AC/DC conversion device 30.

When the control source unit 22 is started up, the control source unit 22 supplies the power which has been converted into the prescribed voltage to the communication unit 24, the control unit 26, and the battery management units 12 of the battery panels 10A-10C. In addition, the control source unit 22 also supplies power to the fan 29 and the air-conditioning equipment acting as the cooling unit.

When the battery management unit 12 is started up, the management unit 122 detects the voltages and temperatures of the secondary battery cells 13 to thereby start monitoring the secondary battery cells 13, and the communication unit 124 communicates that the battery management unit 12 is normally started up to the communication unit 24 of the DC/DC conversion device 20. Receiving that the battery management unit 12 is normally started up, the communication unit 24 transmits that to the control unit 26.

The control unit 26 controls the DC/DC conversion device 20 to thereby convert the discharge power form the battery pack 14 or the power from the AC/DC conversion device 30, and transmits the control signal so that the battery pack 14 is discharged or charged to the communication unit 124 of the battery management unit 12 through the communication unit 124.

When the battery management unit 12 is started up and the battery pack 14 becomes able to discharge, the DC/DC converter 28 converts the power outputted from the battery pack 14 into the prescribed voltage and supplies the converted power to the control source unit 22 to thereby use it as a power source of the control source unit 22.

In case that the AC/DC conversion device 30 can not supply power, a user turns on the switch SW to supply power to the communication unit 24, the control unit 26 and the battery management unit 12 from the battery BT and thereby starts up the battery management unit 12.

When the battery management unit 12 is started up, the management unit 122 detects the voltages and temperatures of the secondary battery cells 13 to thereby start monitoring the secondary battery cells 13, and the communication unit 124 notices that the battery management unit 12 is normally started up to the communication unit 24 of the DC/DC conversion device 20. Receiving that the battery management unit 12 is normally started up, the communication unit 24 transmits the control signal so that the battery pack 14 is discharged to the communication unit 124 of the battery management unit 12.

The control unit 126 of the battery management unit 12 controls the battery pack 14 to be discharged based on the control signal received through the communication unit 124. The power outputted from the battery pack 14 is supplied to the DC/DC converter 28. The DC/DC converter 28 directly outputs the power supplied from the battery pack 14 through a built-in diode (not shown) to the control source unit 22 and the AC/DC conversion device 30. At this time, there is no need for the control unit 26 to perform drive control for voltage conversion, and as a result, the power to drive the DC/DC converter 28 becomes unnecessary.

The control source unit 22 is started up when the power is supplied from the DC/DC converter 28, and supplies power to the communication unit 24, the control unit 26 and the battery management unit 12. After confirming the start up of the control source unit 22, the control unit 26 starts the drive control of the DC/DC converter 28. In addition, the control source unit 22 supplies power also to the fan 29 and the air-conditioning equipment acting as the cooling unit.

When the control source unit 22 is started up, the battery management unit 12 can be operated with the power which the battery pack 14 discharges, and since the power discharged form the battery pack 14 can be converted into the prescribed voltage based on the drive control of the control unit 26, the battery system continues its operation even if the power supply from the battery BT is stopped. As described above, in the present embodiment, even under the circumstance in which power supply is not obtained from outside, it becomes possible to start up the battery system. That is, according to the present embodiment, it is possible to provide a battery system which can be started up irrespective of the installation environment thereof.

In addition, it is only necessary for the battery BT to output power enough to start up and operate the communication unit 24, the control unit 26 and the battery management unit 12 at least till the control source unit 12 is started up, and thereby a large-size battery is not required. That is, being provided with the battery BT, the DC/DC conversion device 20 does not grow in size, and thereby the increase in cost of the battery system can be suppressed.

In addition, all the battery management units 12 of the battery panels 10A-10C are not necessarily to be the battery management unit 12 to which power is supplied from the battery BT, but the battery management unit 12 of a specific battery panel may be the battery management unit 12 like that. In case that the battery management unit 12 of the battery panel 10A is started up with the battery BT, for example, the control unit 26 of the DC/DC conversion device 20 may use the battery packs 14 of the battery panels 10B, 10C other than the battery panel 10A to be discharged by priority, and may maintain the battery pack 14 of the battery panel 14A so that a prescribed amount of power is charged in it and can be used at the time of emergency.

In addition, in the present embodiment, the control source unit 22 is started up using the power of the battery panels 10A-10C, but in case that any of the battery panels 10A-10C has solar battery cells, the control source unit 22 may be started up with the power outputted from the solar battery cells.

When the battery system is normally operated with the power from the AC/DC conversion device 30, in case that the power supply from the AC/DC conversion device 30 is stopped, the control source unit 22 stops once. At this time, power is supplied from the battery BT to the communication unit 24, the control unit 26 and the battery management unit 12, the communication unit 24, the control unit 26 and the battery management unit 12 continue to operate, and the discharge power of the battery pack 14 is supplied to the interactive DC/DC converter 28, and the control source unit 22 is again started up with the output power of the interactive DC/DC converter 28. Accordingly, it is possible to continue to supply power to the load connected to the interactive DC/DC converter 28 without being instantaneously interrupted.

Next, a battery system of a second embodiment will be described in detail with reference to the drawings. In addition, in the following description, the same symbols are given to the same configuration components as in the above-described first embodiment, and the description thereof will be omitted.

Figure 2:
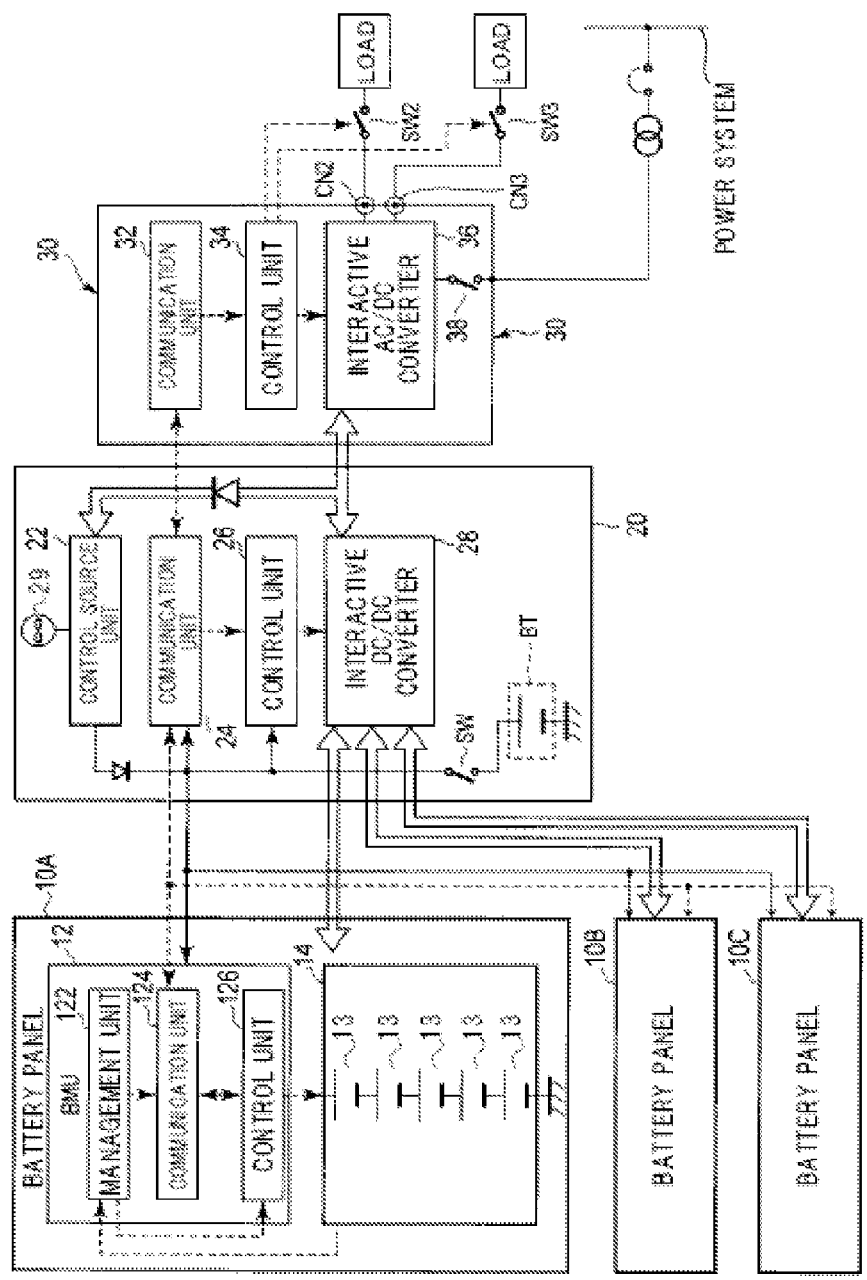
FIG. 2 is a diagram schematically showing a configuration example of a battery system of a second embodiment.

FIG. 2 is a diagram schematically showing a configuration example of a battery system of the present embodiment. The battery system of the present embodiment is provided with the plurality of battery panels 10A-10C, the DC/DC conversion device 20, and the AC/DC conversion device 30.

In the present embodiment, the configurations of the battery panels 10A-10C, and the DC/DC conversion device 20 are the same as in the above-described first embodiment. In addition, in FIG. 2, the connecting portion CN1 (DC load connecting portion) may be provided, though not shown in the drawing, so as to connect a load to the interactive DC/DC converter 28 in the DC/DC conversion device 20 in the same way as FIG. 1.

The AC/DC conversion device 30 is provided with a communication unit 32, a control unit 34, an interactive AC/DC converter 36, connecting portions (AC load connecting portions) CN2, CN3 to connect loads through switches SW2, SW3, respectively, and a magnetic contactor 38.

The communication unit 32 communicates with an upper level control device (not shown) and the communication unit 24 of the DC/DC conversion device 20. The communication unit 32 receives the remaining capacities and so on of the battery packs 14 of the battery panels 10A-10C, and transmits them to the upper level control device and the control unit 34, and receives a control signal from the upper level control device and transmits it to the control unit 34 and the communication unit 24.

The control unit 34 controls the interactive AC/DC converter 36 based on the control signal from the upper level control device which is received from the communication unit 32. In addition, the control unit 34 controls the switches SW2, SW3 to thereby switch over the connections of the loads and the interactive AC/DC converter 36.

The control unit 34 may set priorities to the connecting portions CN2, CN3, and may switch over the switches SW2, SW3. For example, in case that power is supplied to the connecting portions CN2, CN3 in this priority order, when the remaining capacities of the battery packs 14 received from the communication unit 32 are not less than a prescribed value, the control unit 34 turns on both the switch SW2 and the switch SW3 to thereby supply power from the connecting portions CN2, CN3, and when the remaining capacities are less then the prescribed value, the control unit 34 turns on the switch SW2 and turns off the switch SW3 to thereby supply power from only the connecting portion CN2. Under the circumstance in which power can not be obtained from an electric power system, though an amount of the power which can be supplied to loads is limited, priorities are set to the connecting portions CN2, CN3, and a user connects a high-priority load to the connecting portion CN2, and thereby the loads can be used efficiently.

The interactive AC/DC converter 36 converts the power supplied from an electric power system into DC power and output it to the DC/DC conversion device 20, and converts the power supplied from the DC/DC conversion device 20 into AC power and outputs it to loads.

In the present embodiment, a plurality of loads are connected to the interactive AC/DC converter 36 through the switches SW2, SW3. The interactive AC/DC converter 36 supplies power to the connected loads in accordance with the control signal from the control unit 34.

The magnetic contactor 38 turns off and turns on a power supply line between the electric power system and the interactive AC/DC converter 36. The magnetic contactor 38 is turned off at the time of power interruption to thereby disconnect the interactive AC/DC converter 36 from the electric power system.

The configuration of the present embodiment is the same as in the above-described first embodiment except the above-described configuration. That is, under the circumstance in which power can not be obtained from an electric power system, in the same manner as in the battery system of the above-described first embodiment, the battery panels 10A-10C, and the DC/DC conversion device 20 can be started up. When the DC/DC conversion device 20 is started up, the power outputted from the interactive DC/DC converter 28 is supplied to the interactive AC/DC converter 36 and thereby the interactive AC/DC converter 36 is started up, and the power which has been converted into AC power by the interactive AC/DC converter 36 is supplied to the loads through the connecting portions CN2, CN3. Accordingly, the power supply to the load connected to the AC/DC converter 36 can be continued without being instantaneously interrupted.

In addition, the communication unit 32 and the control unit 34 of the AC/DC conversion device 30 can be started up with the power supplied from the electric power system, and can also be started up with the power outputted from the interactive AC/DC converter 36. Under the circumstance in which power can not obtained from an electric power system, the communication unit 32 and the control unit 34 are started up with the power outputted from the interactive AC/DC converter 36.

That is, according to the present embodiment, it is possible to provide a battery system which can be started up irrespective of the installation environment, in the same manner as the first embodiment.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery system comprising:
    a battery panel which includes a battery pack including a plurality of secondary battery cells, and a battery management unit to monitor at least one of a voltage, a temperature and a degradation level of the secondary battery cell; and
    a DC/DC conversion device including:
    an interactive DC/DC converter which converts power discharged from the battery pack into a prescribed voltage to output converted power, and converts power supplied from outside into a prescribed voltage to output converted power;
    a control unit which controls the interactive DC/DC converter;
    a communication unit which communicates with the battery management unit and the control unit;
    a control source unit which converts the power supplied from the interactive DC/DC converter or from outside into a prescribed voltage to supply converted power to the control unit, the communication unit, and the interactive DC/DC converter;
    a battery connected to a power supply line of the control source unit through a switch and operable to supply power to the control unit;
    an AC/DC conversion device connected to the DC/DC conversion device, the AC/DC conversion device operable to supply power to the control unit through the control source unit, the AC/DC conversion device including:
    an interactive AC/DC converter which converts the power outputted from the DC/DC converter into AC power to output converted power, and converts power supplied from outside into DC power to output converted power;
    an AC load connecting portion from which the power outputted from the interactive AC/DC converter is outputted;
    a switch which switches over connection of the connecting portion and a load;
    a second control unit which controls the interactive AC/DC converter and switch.

2. The system of claim 1, wherein the battery, when the power is not supplied to the DC/DC conversion device from outside, supplies power to the communication unit, the control unit and the battery management unit through the turned on switch to start up the communication unit, the control unit and the battery management unit.

3. The system of claim 1, wherein the AC load connecting portion includes a plurality of connecting portions, and the second control unit controls the interactive AC/DC converter so as to output the power to the plurality of connecting portions in accordance with given priorities.

4. The system of claim 3, wherein the AC/DC conversion device further including:
    a second communication unit which communicates with the communication unit to receive a remaining capacity of the battery pack and transmits the remaining capacity to the second control unit;
    wherein the second control unit, in accordance with the remaining capacity of the battery pack, controls the interactive AC/DC converter so as to output the power to the plurality of connecting portions in descending order of priority.

5. The system of claim 1, wherein the secondary battery cell is a lithium ion secondary battery cell.

6. The system of claim 1, wherein the secondary battery cell is a lead battery cell.

7. The system of claim 1, wherein the DC/DC conversion device further including:
    cooling unit which cools the interactive DC/DC converter;
    wherein the control source unit supplies power to the cooling unit.

8. The system of claim 1, wherein the DC/DC conversion device further including:
    a DC load connecting portion which outputs the power outputted from the interactive DC/DC converter.

9. The system of claim 1 further comprising:
    a diode connected between the control source unit and the control unit.

* * * * *